US006857836B2

(12) United States Patent
Keller

(10) Patent No.: US 6,857,836 B2
(45) Date of Patent: Feb. 22, 2005

(54) WHEELED TRANSPORTS

(76) Inventor: William A. Keller, 12075 270th Ave. NE., Belgrade Kandiyohi County, MN (US) 56312

( * ) Notice: Subject to any disclaimer, the term of this patent is extended or adjusted under 35 U.S.C. 154(b) by 0 days.

(21) Appl. No.: 09/873,903

(22) Filed: Jun. 4, 2001

(65) Prior Publication Data
US 2002/0044853 A1 Apr. 18, 2002

Related U.S. Application Data

(60) Provisional application No. 60/208,808, filed on Jun. 2, 2000.

(51) Int. Cl.$^7$ .................................................. B66F 9/12
(52) U.S. Cl. ......................... 414/11; 269/905; 280/79.7; 414/743
(58) Field of Search ............................ 280/43.2, 79.7, 280/766.1; 269/905; 414/11, 743, 815

(56) References Cited

U.S. PATENT DOCUMENTS

| | | | |
|---|---|---|---|
| 1,358,235 A | | 11/1920 | Nylin |
| 1,501,609 A | | 7/1924 | Linden |
| 2,028,133 A | | 1/1936 | Bowers |
| 2,397,317 A | | 3/1946 | Hulburt et al. |
| 2,398,584 A | * | 4/1946 | Goodrich ............ 280/47.34 X |
| 2,466,149 A | | 4/1949 | Burg |
| 2,514,308 A | | 7/1950 | Burg |
| 2,967,627 A | * | 1/1961 | Vinson ...................... 414/11 X |
| 3,007,710 A | | 11/1961 | Sykes |
| 3,138,265 A | * | 6/1964 | Hansen ........................ 414/428 |
| 3,693,996 A | | 9/1972 | Hardy |
| 3,729,209 A | | 4/1973 | Litz |
| 3,923,167 A | * | 12/1975 | Blankenbeckler ............ 414/11 |
| 4,726,602 A | | 2/1988 | Sanders et al. |
| 5,584,635 A | * | 12/1996 | Stapelmann ................. 414/11 |
| 5,762,348 A | | 6/1998 | Echternacht |
| 6,241,447 B1 | * | 6/2001 | Echternacht ................. 414/11 |

* cited by examiner

Primary Examiner—Janice L. Krizek
(74) Attorney, Agent, or Firm—Albert W. Watkins

(57) ABSTRACT

An all-direction transport includes a triangular wheeled platform for stable movement over a surface such as a factory, business or gymnasium floor, pathway or roadway. A load support is pivotally attached to the wheeled platform, and can pivot from a horizontal position parallel to the platform to a vertical position perpendicular to the platform. An extensible brace extends from the platform to load support when in an operative position. A pin passes through one part of the brace, which allows the load support to pick up a load from vertical position, while preventing the load support from moving beyond a predetermined limit towards horizontal. The brace is additionally removably pinned on one end to either the platform in an operative position or to the load support in a storage position, to allow the transport to be folded relatively flat. The load support additionally may be extensible in either horizontal direction, vertical direction or both. Other alternative embodiments are also described.

16 Claims, 4 Drawing Sheets

WHEELED TRANSPORTS

PRIORITY

This application claims priority to U.S. Provisional Application Ser. No. 60/208,808, the contents which are incorporated by reference in entirety.

BACKGROUND OF THE INVENTION

1. Field of the Invention

This invention pertains to land vehicles generally, and more particularly to wheeled vehicles which are stable when loading and traveling, and which are propelled by an attendant. More particularly, the present invention pertains to vehicles that are sufficiently stable and safe for a single person to load and transport a wide variety of otherwise oversized or awkward cargo.

2. Description of the Related Art

Transport of large or oversized loads has typically presented challenges for people in many diverse industries. In schools and businesses, large tables and blackboards must occasionally be transported, either at the time of purchase and placement, or to accommodate various special events. This has typically required a large number of persons to each lift a part of the load. Unfortunately, if a person should accidentally trip, one or more of the persons may be seriously injured and the load may also be damaged.

In manufacturing, large or oversize sheets, panels, plates and the like must be moved about. In construction, various sheets, panels and construction modules need moved. Even in the furniture industry, mattresses must be moved about. Regardless of the industry, the handling of these large, typically very awkward, and sometimes heavy loads has been difficult. The use of more people to move these loads is generally unsafe, as aforementioned, and other approaches have long been desired.

In some industries, such as manufacturing, a forklift may be available to assist a person with the transport of a large load. The forklift is designed to support relatively large and heavy loads. Unfortunately, a forklift also requires special operator training, a substantial amount of space to move about, provides no cushioning for the load being transported, no tactile feedback for the operator in the event an obstacle or hindrance is encountered, and the lift is very expensive to purchase and operate. Consequently, the operation of a forklift generally is limited to those situations where cargo is delivered in shipping packages or the like or is durable enough to withstand heavy handling, and also where the cargo is being moved frequently enough to justify the cost of the machine and trained operator.

Where a forklift is not appropriate or available, hand trucks, rolling carts or the like have been used. The two-wheel hand truck or "dolly" is well known for transporting loads, and has been provided with various features to assist with particular loads. While the two-wheel hand truck is of tremendous help in transporting objects which are close in size to the hand truck, loads which are much larger are very difficult and often unsafe to carry. This stems from several limitations of the hand truck. First, the hand truck is balanced upon only two wheels. When a load is much larger than the toe of the hand truck, it is difficult for an operator to exactly balance at the midpoint of the load. Consequently, the load will all too often be slightly off-balance, which causes the hand truck to tend to wander or veer off course when being moved. Furthermore, the hand truck may also be relatively difficult to balance in a transport position, since the distance between the hand truck toe and operator hand may be relatively small compared to the overall height of the load. In this case, a great deal of operator strength may be required just to balance the hand truck about the axle of the two wheels.

The use of various carts and tables has also been proposed, and proves effective for the transport of relatively smaller loads, particularly where the load is comprised of many smaller packages. A single operator can then stack the smaller packages onto the cart or table, and then roll the table with load to a new location. The table or cart has the distinct advantage of not requiring an operator to balance the load. Once the load is placed upon the cart, the cart may be left stationary with no operator even present. Unfortunately, with a table or cart, the load most generally must be supported in a horizontal plane. Large planar or sheet-type material such as the aforementioned building sheets, mattresses or the like are often large enough to be difficult to load and handle when transported horizontally. Other carts have been constructed that enable large loads to be transported in a vertical plane. Unfortunately, there is no mechanism provided for loading the cart, and so the placement of the load upon the cart still requires the assistance of either more persons or forklifts or the like. Consequently, there has long been a need for a transport which overcomes the limitations of the prior art.

SUMMARY OF THE INVENTION

In a first manifestation, the invention is a wheeled transport for assisting with the safe and effortless transporting of large or awkward loads over a pathway surface. A platform forms a generally horizontal support surface. Wheels are attached to the platform upon which the platform is supported during use and storage. A load support is pivotally attached to the platform. An adjustable length brace is pivotally attached to the platform at a location distal to the load support pivotal attachment. The brace is also pivotally attached to the load support at a location distal to where the load support attaches to the platform. A means is provided for maintaining a minimum length within said adjustable length brace between load support and platform, while still allowing the adjustable length brace to extend without resistance beyond the minimum length.

In a second manifestation, the invention is a method of lifting and transporting a load upon a transport having a transport platform and a load support pivotally attached to said transport platform. The steps include positioning the load support relative to transport platform at a location within an operative range of relative rotation; activating an extensible brace between load support and transport platform to limit operative range of rotary motion therebetween; supporting the load upon load support; pivoting the load support relative to transport platform about the pivotal attachment; and moving the transport platform across a surface to thereby transport the load.

OBJECTS OF THE INVENTION

A primary object of the present invention is the provision of a transport which may be used by a single, untrained operator to easily and safely move loads that would otherwise be difficult or unsafe for a single person to carry. A second object of the invention is to enable transport of diverse loads having different weights, sizes and geometries. A third object of the invention is to enable the operator to release the transport and have the load be retained entirely by the transport. A further object of the invention is to enable the operator to safely and simply lift the load from the ground into transport position without additional assistance. Another object of the invention is to provide a transport with takes up a minimum amount of space both during use, to enable easier maneuvering and operation in tight spaces, and also which may be compactly stored during periods of non-use or shipping. These and other object of the invention are accomplished in the preferred and alternative embodiments, which may be best understood when considered in association with the text hereinbelow and appended drawing figures.

DESCRIPTION OF THE PREFERRED EMBODIMENT

Figure 1:
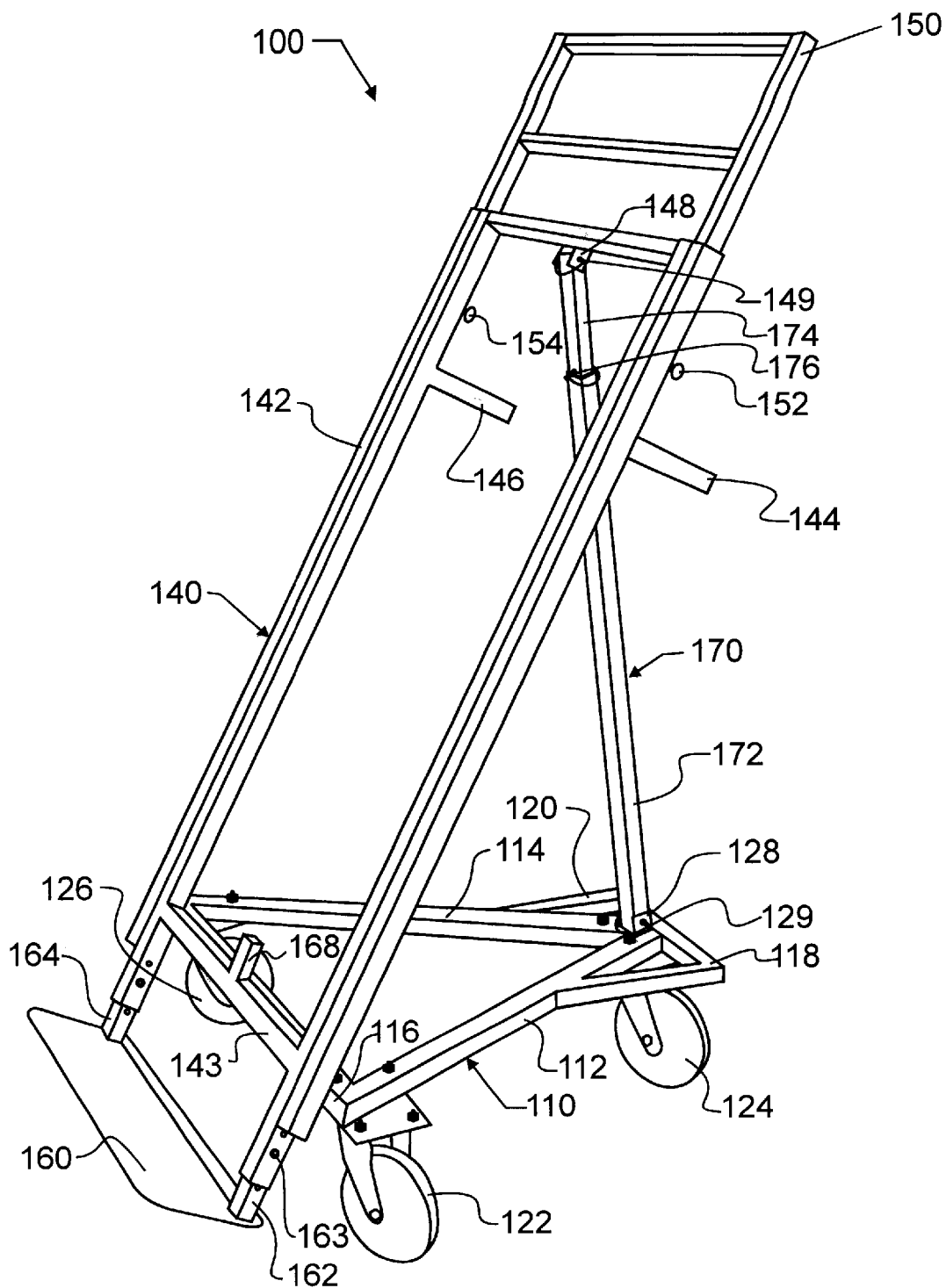
FIG. 1 illustrates a first preferred embodiment all-directional transport from a projected view.

Preferred embodiment all-direction transport 100 includes three major assemblies. Platform 110, load support 140 and brace 170 are assembled in use position, as illustrated in FIG. 1, to form a vertical, generally triangular prism configuration. Platform 110, which forms the base of the triangular prism in FIG. 1, forms a stable wheel-base upon which the rest of all-direction transport 100 is assembled. Platform 110 in the preferred embodiment includes a triangular framework comprising tubes 112, 114 and 116. While a triangular platform is illustrated in the preferred embodiment, it will be apparent that other shapes and geometries may be used as well, depending upon the particular demands and design criteria selected.

At the junctions of each of tubes 112, 114, 116 wheels 122, 124 and 126 are mounted. Most preferably, these wheels are swivel mounted, which allows the transport 100 to be moved or turned in any direction relatively effortlessly. Wheels 122, 124, 126 may be of any size and type suited for the application, including pneumatic, semi-pneumatic, solid or foamed, or any other variant that carries the intended loads satisfactorily. For example, where irregular surfaces are likely to be encountered, larger wheels will normally be preferred. Similarly, where some cushioning of the load is desirable, pneumatic or foamed tires may be preferred.

To provide a place where an operator may step to exert force on all-direction transport 100 during use, as will be described hereinbelow, and incidentally providing additional support for wheel 124, two additional smaller triangular steps 118, 120 are provided. At the juncture of steps 118, 120 and tubes 112, 114, a receiver 128 is provided, along with pin 129.

Load support 140 forms one of the vertically extending faces of the generally triangular prism shape of all-direction transport 100, when in the use position illustrated in FIG. 1. The shape and features illustrated in the preferred embodiment load support 140 resemble those of a common hand truck. While this configuration is preferred, and as will be explained hereinbelow, there are a wide variety of shapes, configurations, and even materials that may be used satisfactorily for load support 140. In the event transport 100 will be used with only a single type of cargo, load support 140 will then most preferably be custom shaped for specific loads. Nevertheless, in the preferred embodiment transport 100, load support 140 is shown in a more generic configuration which is adapted to a wide variety of diverse cargo.

Central frame 142 will frequently serve as the vertical support for a load or cargo that is carried upon transport 100. Two small handles 144, 146 protrude from frame 142, most preferably at a height convenient to an operator to grasp. The location, geometry, and even the actual existence of handles 144, 146 is not critical to the invention. However, in the preferred embodiment, these handles provide additional leverage and improved handling during the use of transport 100. They enable the operator to grasp and control load support 140 while very large, oversized loads are supported upon load support 140. In an alternative, one u-shaped bar maybe provided centrally on frame 142, or several such bars may be provided as an alternative to handles 144, 146.

Figure 2:
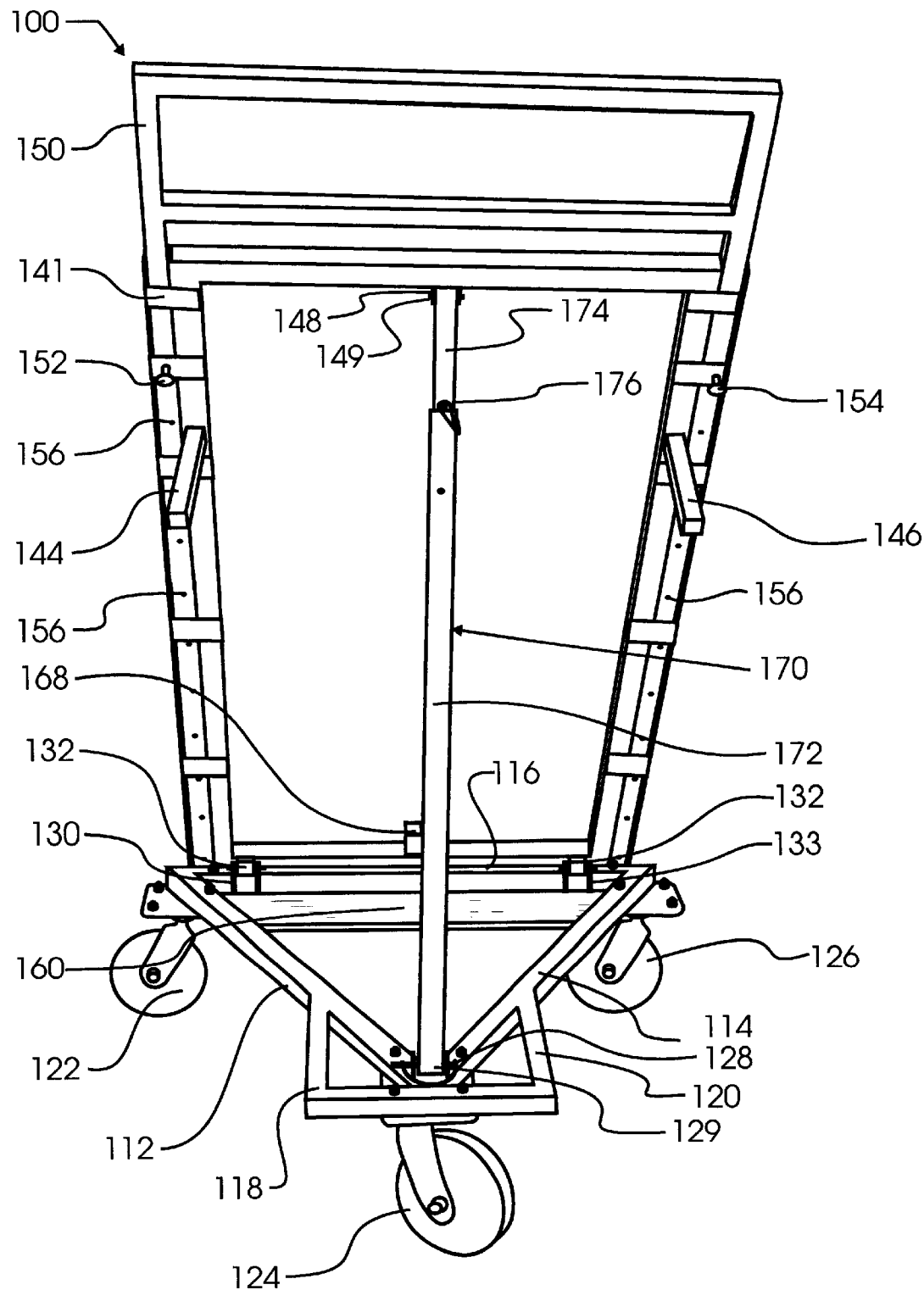
FIG. 2 illustrates the transport of FIG. 1 from a rear, operator view.

Extension 150 is provided in the preferred embodiment as a telescopic extension from frame 142. Extension 150 is used for transporting loads which are substantially taller than frame 142, and which therefore require support beyond the end of frame 142. Spring pins 152, 154 are provided which engage in cooperating holes 156 formed in extension 150 to prevent extension 150 from unintentionally collapsing during use. However, in the preferred embodiment, these pins are released to not interfere with movement of extension 150 until extension 150 is set to the desired relative position. Then pins 152, 154 are released and pass into holes 156, thereby securing extension 150. While extension 150 is contemplated in the preferred embodiment, the present invention is extendible not only in the vertical direction but also in the horizontal direction, either in addition to vertical extension or instead of vertical extension 150. The same general principles apply to the extension, whether in the vertical or horizontal direction. In addition, while pins 152, 154 and holes 156 are illustrated, and extension 150 is illustrated as being telescopic, it will be apparent that other techniques and methods maybe provided for extending frame 142. Additionally, the open framework illustrated in FIG. 2, including retaining straps 141 which retain extension 150 within an otherwise three-sided cavity, is preferred, although solid and fully enclosed tubes forming the support for extension 150 are also an alternative.

Opposite of extension 150 is toe 160. Toe 160, which in the preferred embodiment again resembles the ordinary hand truck toe, may once again assume any appropriate geometry for a particular load. In recognition of this fact, in the preferred embodiment toe 160 may be attached to frame 142 through tubes 162, 164 that pass into frame 142, and which are retained therein through pins or bolts 163 or the like. This allows toes of different geometries to be added or installed at will by an operator. Toe 160 may alternatively be hinged to raise and become parallel to or coplanar with frame 142, if appropriate for a given load.

At the top center of frame 142, adjacent extension 150 is a receiver 148 that will most preferably comprise two parallel, planar surfaces that are spaced sufficiently to allow brace 170 to be inserted therein and pivot on pin 149. A second receiver 168 is provided on cross member 143 of frame 142, adjacent toe 160. Receiver 168 may be configured similarly to receiver 148, though in the preferred embodiment receiver 168 is only used during storage, as will be explained herein below, and will not require the use of any pins.

The third major assembly, brace 170, forms the other of the vertically extending faces of the generally triangular prism shape of all-direction transport 100 when in the use position illustrated in FIG. 1. Brace 170 is illustrated in the preferred embodiment as a single telescopic tube. However, and while this is the most preferred embodiment owing to small size and weight, minimal interference with the other components of transport 100, and relatively low cost to manufacture, other braces known in the mechanical arts may also be used. Brace 170 includes an outer tube 172 having at a first end adjacent platform 110 (as shown in FIG. 1) a hole through which pin 129 may pass to secure brace 170 to platform 110. Brace 170 also includes a smaller tube 174 designed to extend telescopically from tube 172 to load support 140, where smaller tube 174 attaches at pin 149. Most preferably, smaller tube 174 will have one or more holes along the tube length through which a hasp pin, bolt or the like may be passed. Pin 176 will most preferably be sufficiently large to prevent smaller tube 174 from passing completely into outer tube 172. Pin 176 is then used to limit the minimum length of brace 170, while still allowing brace 170 to be extended to a greater length.

As aforementioned, FIG. 1 is a use position. From this position, most loads will be supported upon load support 140. The angle of frame 142, which is somewhere between horizontal and vertical, uses the force of gravity to hold a load or cargo against frame 142. However, at the time of loading, toe 160 will most preferably be down against a floor, the ground or the like, and be parallel thereto. In this position, frame 142 will extend in a vertical direction, and brace 170 will be extended substantially longer than shown in FIG. 1. Toe 160 will then be slid under a load until frame 142 is adjacent the load. Next, if not already done, the minimum length for brace 170 is determined and set by placing pin 176 in the appropriate hole in smaller tube 174. Depending upon the size of the load vertically, the operator will either use the top of extension 150 or handles 144, 146 to pull the top of load support 140 from vertical towards the transport position of FIG. 1. The operator may also use steps 118, 120 at this time to prevent the platform from moving towards the operator. While this motion is similar to that of a standard hand truck, a large load could easily get away from an operator if the standard hand truck were being used at this point. However, the use of brace 170 and platform 110 ensures that load support 140 does not rotate too far and topple or crash to the ground. The load is simply rotated until preset pin 176 engages against outer tube 172. The load may then be rolled upon wheels 122, 124, 126 from and to any desired location. Furthermore, the load does not require constant operator support. Transport 100 is entirely self-supporting of the load during use. Unloading is equally as simple, where the operator may, for example, step onto steps 118 or 120 and then force the top of load support 140 forward. When toe 160 touches the ground, transport 100 is backed away from the load, to slide toe 160 out from under the load.

Figure 4:
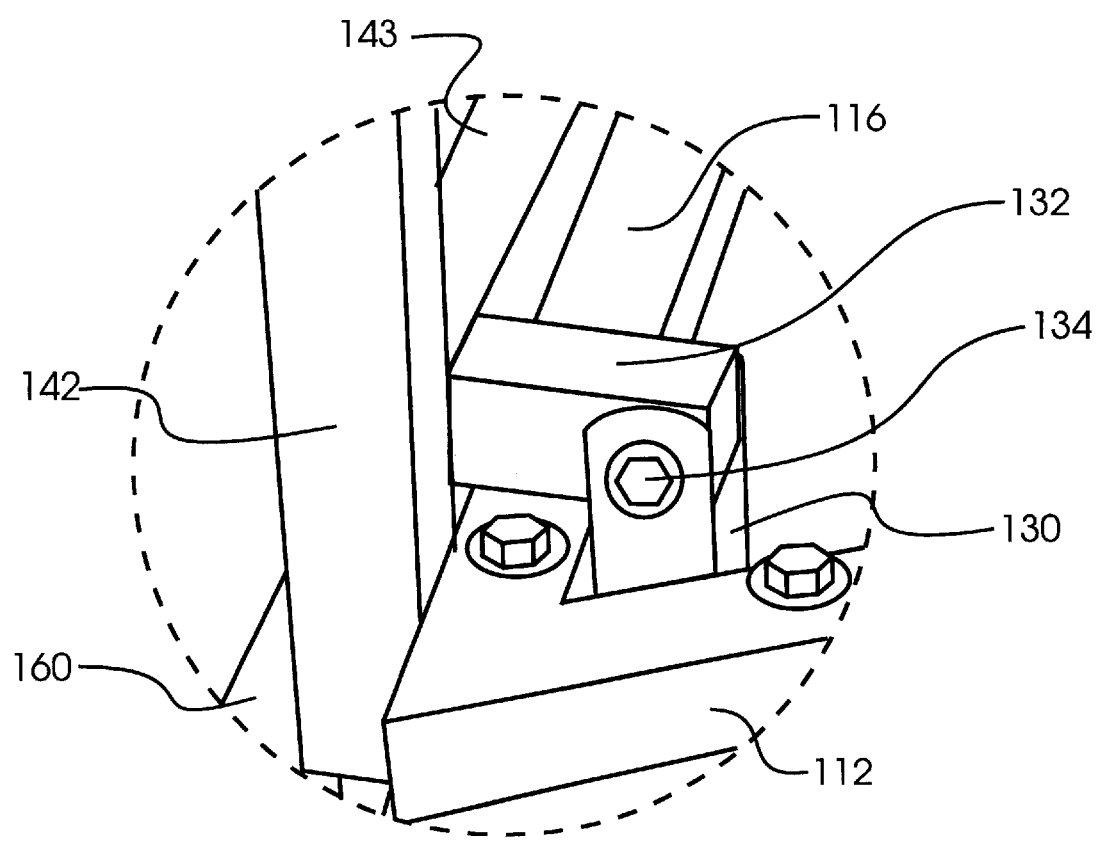
FIG. 4 illustrates the pivotal linkage between load support and platform from a projected view.

The operation of the pivot between load support 140 and platform 110 is shown in greater detail in FIG. 4, where one of the two pivots is illustrated. The illustration of FIG. 4 shows the pivot in the loading position, with toe 160 parallel to the ground and frame 142 extending vertically. In this position, bar 132, which is rigidly attached perpendicular to frame 142 and cross member 143, extends parallel to the ground and the general surface of platform 110. The end of bar 132 distal to frame 142 has a hole through which pin 134 passes. Pin 134 is supported on bar 130, which extends in a vertical direction normal to platform 110. As load support 140 is tilted back, the positioning of the pivot above and behind tube 116 ensures the load is lifted up off of the ground and is drawn towards the operator. In this way, tilting alone is sufficient to lift the load for transport.

Figure 3:
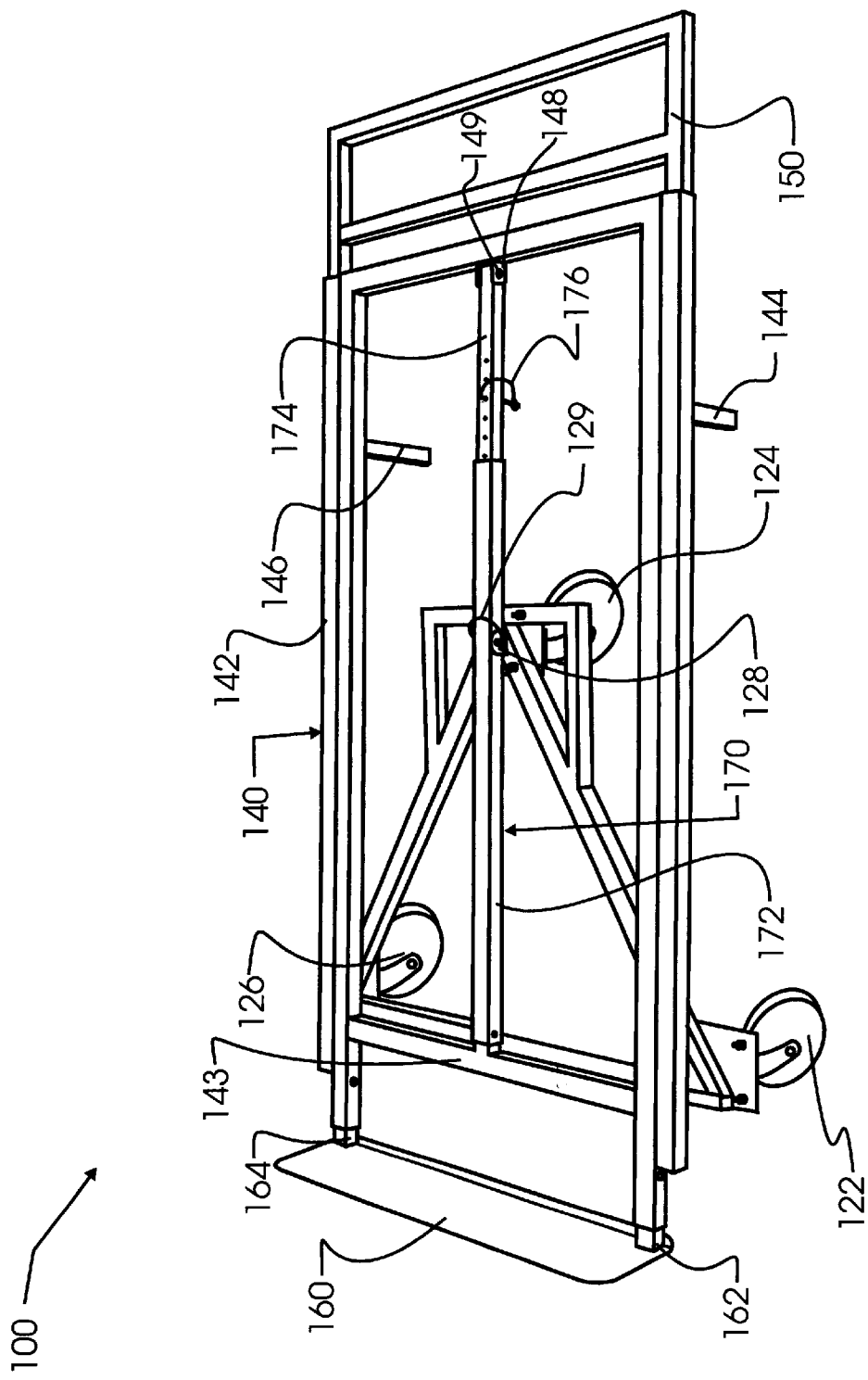
FIG. 3 illustrates the transport of FIG. 1 in a storage or shipping position.

FIG. 3 illustrates transport 100 in a storage position. The conversion from FIG. 1 to FIG. 3 simply requires the operator to remove pin 129 from receiver 128 and pivot brace 170 into engagement with receiver 168. Next, load support 140 is rotated into a horizontal position on top of platform 110, and pin 129 is passed through receiver 128 and brace 170. This secures platform 110, brace 170 and load support 110 all in generally parallel, planar relationship, consuming a minimum of space for non-use or storage, or for transporting from an entirely horizontal position. Conversion from horizontal position back to the triangular prism configuration of FIG. 1 is simply a reversal of the aforementioned steps. Consequently, the use and configuration of the preferred embodiment all direction transport 100 is simple enough to not require any special training, while still ensuring safe use and operation for all types of cargo and without requiring extra storage space when not in use.

While the foregoing details what is felt to be the preferred embodiment of the invention, no material limitations to the scope of the claimed invention are intended. Further, features and design alternatives that would be obvious to one of ordinary skill in the art are considered to be incorporated herein. For example, various materials of construction and geometries of components are contemplated herein. Similarly, various wheels, wheel types and wheel directions or orientations are contemplated. Alternative all-direction transports have been designed to have two fixed wheels pointing forward, as in a standard "dolly" type hand truck, or in other alternatives sideways for movement in a single direction. These and other variations, whether specifically described herein or not but which will be apparent to those of skill in the field after reviewing the present specification, will be understood to be incorporated herein. The scope of the invention is set forth and particularly described in the claims hereinbelow.

I claim:

1. A wheeled transport for assisting with the safe and effortless transporting of large or awkward loads over a pathway surface, comprising:

a platform forming a generally horizontal support surface;

wheels operatively attached to said platform upon which said platform may be supported during use and storage;

a load support;

a load support pivotal attachment pivotally attaching said load support to said platform;

an adjustable length brace;

a first adjustable brace pivotal attachment pivotally attaching said adjustable length brace to said platform at a location on said platform distal to said load support pivotal attachment, said first adjustable brace pivotal attachment operatively separable to release said brace from said platform;

a second adjustable brace pivotal attachment pivotally attaching said adjustable length brace to said load support at a location on said load support distal to said load support pivotal attachment;

a means for maintaining a minimum length of said adjustable length brace between said load support and said platform while still allowing said adjustable length brace to extend without resistance beyond said minimum length; and an attachment for attaching said brace to said load support when said brace is released from said platform and to thereby prevent said brace from moving relative to said load support.

2. The wheeled transport of claim 1 further comprising a toe extending from said load support adjacent said first end of said load support.

3. The wheeled transport of claim 2 wherein said toe is removable from said load support.

4. The wheeled transport of claim 1 wherein said load support is extensible to accommodate loads of varying sizes.

5. The wheeled transport of claim 4 wherein said load support is extensible vertically.

6. The wheeled transport of claim 5 wherein said load support comprises a first load support platform, and a vertical extension telescopically retained thereto.

7. A method of transporting a load upon a transport having a transport platform and a load support pivotally attached through a pivotal attachment to said transport platform, including the steps of:

unfolding said transport from a generally planar stored position with said load support and said transport platform generally parallel into an operative generally triangular prism configuration;

positioning said load support relative to said transport platform at a location within an operative range of relative rotation;

activating an extensible brace between said load support and said transport platform to limit said operative range of rotation therebetween by passing a pin through a first elongate brace section, said first elongate brace section telescopically slidable within a second elongate brace section and said pin sufficiently large to prevent said telescopic sliding between said first elongate brace section and said second elongate brace section at said pin;

supporting said load upon said load support;

pivoting said load support relative to said transport platform about said pivotal attachment;

moving said transport platform across a surface to thereby transport said load;

releasing said extensible brace from said transport platform;

affixing said extensible brace within a perimeter defined by said load support; and folding said transport for storage into said generally planar stored position.

8. The method of claim 7 wherein said pivotal attachment is adjacent said platform surface, and said step of pivoting further comprises lifting said load from contact with said surface.

9. The method of claim 7 further comprising the additional step of:

fastening said transport in said generally planar stored position for one-handed transport and storage.

10. The method of claim 7 further comprising the steps of:

pivoting said load support to one extreme of said operative range of relative rotation; and sliding a first portion of said load support under said load after said step of pivoting said load support to said one extreme.

11. The method of claim 10 further comprising the additional steps of:

pivoting said load support relative to said transport platform to lower said load into contact with said surface; and sliding said first portion of said load support from under said load.

12. A wheeled transport for assisting with the safe and effortless transporting of large or awkward loads over a pathway surface, comprising:

a platform forming a generally horizontal support surface;

wheels operatively attached to said platform upon which said platform may be supported during use and storage;

a load support;

a load support pivotal attachment adjacent a first end of said load support and adjacent a top surface of said platform horizontal support surface, and pivotal to permit movement of said load support from being generally parallel to said pathway surface to being generally perpendicular to said pathway surface without displacing said platform relative to said pathway surface;

an adjustable length brace having a first end and a second end distal to said first end;

a first adjustable brace pivotal attachment which operatively pivotally attaches said adjustable length brace first end to said platform at a location on said platform which is both distal to said load support pivotal attachment and proximal to said generally horizontal support surface, said first adjustable brace pivotal attachment is further separable to disconnect said adjustable length brace from said platform for storage;

a second adjustable brace pivotal attachment pivotally attaching said adjustable length brace second end to said load support at a location on said load support distal to said load support pivotal attachment;

an adjustable brace anchor coupled to said load support and adapted to retain said adjustable length brace separated from said platform and in a fixed position relative to said load support for storage; and a means for maintaining a minimum length of said adjustable length brace between said load support and said platform while still allowing said adjustable length brace to extend without resistance beyond said minimum length.

13. The wheeled transport of claim 12 further comprising a mechanical fastener for fastening said load support in a position parallel to said platform horizontal support surface.

14. The wheeled transport of claim 12 wherein said load support is extensible to accommodate loads of varying sizes.

15. The wheeled transport of claim 14 wherein said load support is extensible vertically.

16. The wheeled transport of claim 15 wherein said load support comprises a first load support platform, and a vertical extension telescopically extendable therefrom.

* * * * *